(12) United States Patent
Turpin et al.

(10) Patent No.: US 7,674,204 B2
(45) Date of Patent: Mar. 9, 2010

(54) DEVICE AND METHOD FOR CONTROL OF AN AUTOMATIC GEARBOX FOR CONTROL OF LOCK-UP AND LOCK-UP RELEASE

(75) Inventors: Thomas Turpin, Orsay (FR); Laurent Caniez, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 474 days.

(21) Appl. No.: 11/596,866

(22) PCT Filed: May 26, 2005

(86) PCT No.: PCT/FR2005/050379

§ 371 (c)(1),
(2), (4) Date: Jan. 29, 2007

(87) PCT Pub. No.: WO2005/118328

PCT Pub. Date: Dec. 15, 2005

(65) Prior Publication Data

US 2007/0207898 A1    Sep. 6, 2007

(30) Foreign Application Priority Data

May 28, 2004    (FR) .................................. 04 05775

(51) Int. Cl.
*B60W 10/02* (2006.01)
(52) U.S. Cl. .................... 477/181; 477/84; 477/169
(58) Field of Classification Search .................. None
See application file for complete search history.

(56) References Cited

U.S. PATENT DOCUMENTS

| | | | | |
|---|---|---|---|---|
| 5,547,438 A | | 8/1996 | Nozaki et al. | |
| 5,651,752 A | * | 7/1997 | Wakahara et al. | 477/181 |
| 5,989,156 A | * | 11/1999 | Matsubara et al. | 477/169 |
| 6,042,507 A | * | 3/2000 | Genise et al. | 477/181 |
| 6,151,542 A | * | 11/2000 | Yoshino et al. | 701/54 |
| 6,393,350 B1 | * | 5/2002 | Light et al. | 701/54 |
| 6,449,550 B1 | | 9/2002 | Lutz et al. | |
| 6,468,183 B1 | * | 10/2002 | O'Neil et al. | 477/107 |
| 6,855,090 B2 | * | 2/2005 | Tabata et al. | 477/107 |
| 6,860,834 B2 | * | 3/2005 | Segawa et al. | 477/180 |
| 2004/0166992 A1 | * | 8/2004 | Buchanan et al. | 477/181 |

FOREIGN PATENT DOCUMENTS

DE    102 42 821    3/2004

* cited by examiner

*Primary Examiner*—David D Le
*Assistant Examiner*—Justin Holmes
(74) *Attorney, Agent, or Firm*—Oblon, Spivak, McClelland, Maier & Neustadt, L.L.P.

(57) ABSTRACT

A control device for an automatic gearbox, coupled to the engine or a motor vehicle, by a torque converter, including a locking device for a fixed connection of the output shaft of the engine to the input shaft of the automatic gearbox, to produce a lock-up and conversely to release the lock-up. The device further includes an engine control unit, for providing an order for the engine, such as a demand for torque, and a control unit for the gearbox for transmitting to the engine control unit an order such as a torque request. The gearbox control unit may transmit to the engine control unit a torque request as a function of slip and the torque value as demanded by the driver of the vehicle such that the speed of the engine may approach the speed of a turbine of the torque converter so that a lock-up or lock-up release can be carried out.

8 Claims, 3 Drawing Sheets

Figure 1:
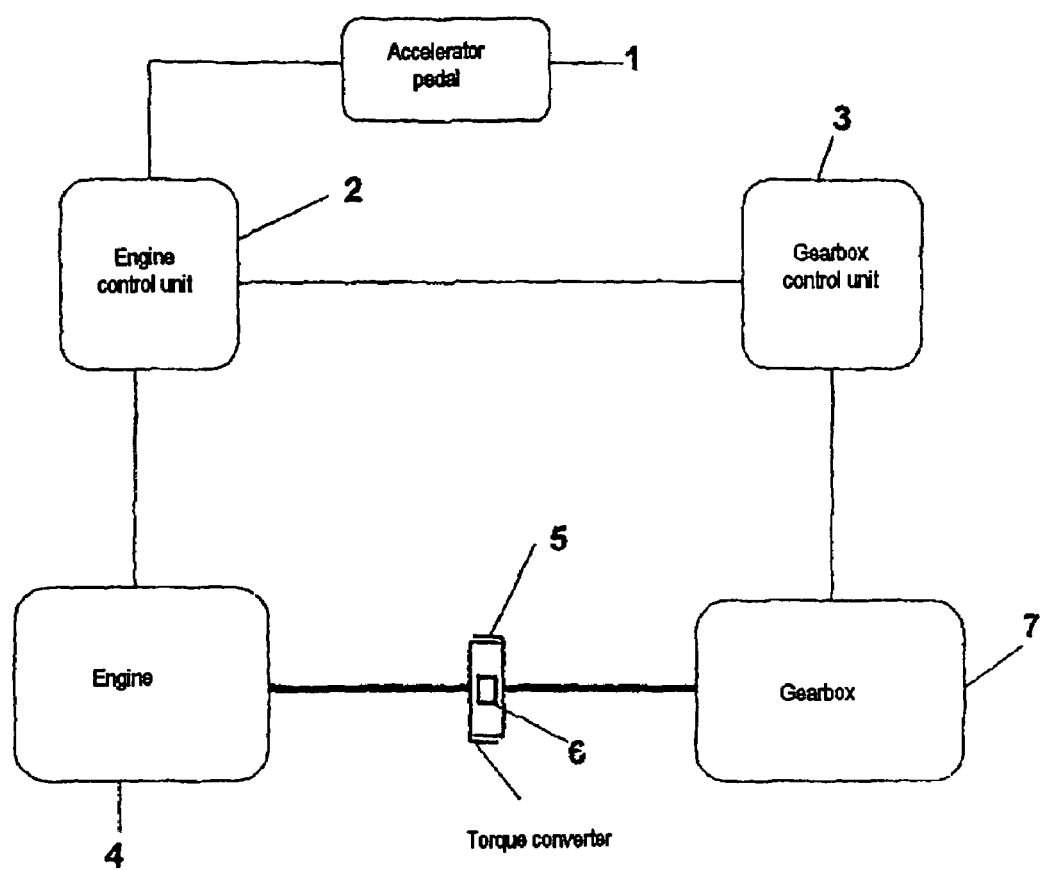

DEVICE AND METHOD FOR CONTROL OF AN AUTOMATIC GEARBOX FOR CONTROL OF LOCK-UP AND LOCK-UP RELEASE

The present invention relates to a device and a method for controlling automatic transmissions of the power drives of motor vehicles.

This invention pertains more particularly to a motor vehicle comprising an automatic ratio-shifting gearbox comprising a hydraulic torque converter and a latching device such as a lock-up, an engine control unit and a gearbox control unit. The engine and gearbox control units can exchange information, in particular the engine control unit can transmit to the gearbox control unit information representative of the torque request of the driver as well as the actual value of the torque provided and the gearbox control unit can transmit to the engine torque presets apt to modify the control of the engine.

The invention proposes to make possible or to improve lock-ups, in particular those performed in retro mode (that is to say with a speed of rotation of the turbine of the converter greater than the speed of rotation of the engine), the lifting of the foot (that is to say the relaxing of the accelerator pedal) during lock-ups and lock-up releases.

Automatic gearboxes comprising a torque converter generally possess a hydraulic lock-up device which makes it possible to interlock the engine shaft with the converter turbine shaft. The lock-up techniques are generally based on control of the pressure in the chamber of the lock-up (latching device). The pressure required for latching depends on the torque provided by the engine, on the engine speed and on the characteristics of the torque converter. The characteristics of the converter are not the same if the converter is in pull mode (the speed of rotation of the input of the converter, equivalent to the speed of the engine, is greater than the speed of rotation of the output of the converter, called the turbine speed) or in retro mode (the speed of rotation of the engine, is less than the turbine speed). When the converter is in retro mode, the pressure required to latch the latching device is much higher than in pull mode, to the point that it is not generally possible to lock-up under these conditions. This has the drawback of making it impossible to perform lock-ups when the driver is not pressing the accelerator, in particular when going down or when braking, this causing a loss of engine brake and a degradation in consumption. This additionally reduces the possibilities of releases of lock-up during certain gear changes, through fear of not being able to lock-up again afterwards.

Generally, the control unit of gearboxes does not send any torque preset to the engine control unit during lock-ups or lock-up releases, or then only in certain well-defined cases.

The aim of the present invention is to make it possible to perform lock-ups from any operating point, in particular when the torque converter is in retro mode C, speed of rotation of the turbine of the converter greater than the speed of rotation of the engine). Another aim is also to improve the quality of lock-ups when the driver torque (torque requested by the driver) decreases strongly during the lock-up, as well as the quality of the lock-up releases.

The main characteristic of the invention is to propose a specific control of the engine torque by the gearbox control unit during lock-ups and releases of lock-up of the latching device (lock-up).

The invention is thus aimed at a device for operating an automatic gearbox coupled to the engine of a motor vehicle by a torque converter comprising a latching device making it possible to interlock the output shaft of the engine and the input shaft of the automatic gearbox so as to effect a lock-up and conversely to effect a release of lock-up, the device furthermore comprising an engine control unit adapted for transmitting to the engine an order such as a torque request and a control unit for the gearbox adapted for transmitting to the engine control unit an order such as a torque preset, said torque request being dependent on the torque requested by the driver and on the torque preset.

According to the invention, this separating device is characterized in that the control unit of the gearbox is adapted to transmit to the control unit of the engine a torque preset as a function of the lip and the torque level demanded by the driver of the vehicle and such that it enables the engine speed to approach the speed of the turbine of the torque converter in order that a back-up or release of lock-up can be executed.

Thus, by virtue of the device according to the invention, the lock-ups and lock-up releases become possible in all cases, even when the torque requested by the driver varies strongly during the lock-ups or lock-up releases.

To execute a lock-up when the speed of the turbine of the converter is greater than that of the engine, the control unit of the gearbox is adapted to transmit to the engine control unit a torque preset greater than the torque requested by the driver of the vehicle so that the speed of the engine becomes close to the speed of the turbine of the converter.

To execute a lock-up during a rapid decrease in the torque of the engine due to a relaxing by the driver of the accelerator pedal, the control unit of the gearbox transmits to the control unit of the engine a torque preset so as to slow down the rate of decrease of the torque.

To execute a lock-up release when the engine is in injection cutoff mode, the control unit of the gearbox is adapted to transmit to the control unit of the engine a torque preset greater than the torque requested by the driver of the vehicle so that the lock-up release does not occur while the engine is in injection cutoff mode.

To execute a lock-up release upon a rapid decrease in the torque of the engine due to a relaxing by the driver of the accelerator pedal, the control unit of the gearbox is adapted to transmit to the control unit of the engine a torque preset so as to slow down the rate of decrease of the torque.

Preferably, the control unit of the gearbox comprises means for adjusting the hydraulic pressure applied to the latching and unlatching device, upon the execution of the lock-ups and releases of lock-ups.

This arrangement makes it possible to effect lock-ups and releases of lock-up smoothly and gently;

In a preferred version of the invention, during lock-ups or releases of lock-up, the control unit of the gearbox is adapted to compare the torque requested by the driver with a target torque and to compare the difference between the speed of the engine and the speed of the turbine with a threshold and to transmit to the control unit of the engine a torque preset so that the engine torque progressively reaches the target torque and the speed of the engine progressively reaches that of the turbine.

The control unit of the gearbox is adapted to determine the target torque and the speed threshold, as a function of the speed of the turbine, of the temperature of the oil of the gearbox and of the gear ratio which is engaged. This target torque must be chosen sufficiently low for the driver not to feel any untoward acceleration of the vehicle and sufficiently high for, in the case of a lock-up release, the engine speed to reach the turbine speed and in this case for it to be possible for a new injection of the engine to occur. This target torque may be different depending on whether a lock-up or a lock-up release is performed.

According to another aspect of the invention, the method of controlling a lock-up or lock-up release in an automatic gearbox coupled to the engine of a motor vehicle by a torque converter comprising a latching device making it possible to interlock the output shaft of the engine and the input shaft of the automatic gearbox so as to effect a lock-up and conversely to effect a release of lock-up, and furthermore comprising an engine control unit adapted to transmit to the engine an order such as a torque request and a control unit of the gearbox adapted to transmit to the control unit of the engine an order such as a torque preset, said torque request being dependent on the torque requested by the driver and on the torque preset, is characterized in that to render a lock-up or a lock-up release executable, the control unit of the gearbox transmits to the control unit of the engine a torque preset as a function of the slip and the torque level demanded by the driver of the vehicle and such that it enables the engine speed to approach the speed of the turbine of the torque converter.

Other features and advantages of the invention will become further apparent throughout the description hereinbelow.

Figure 2:
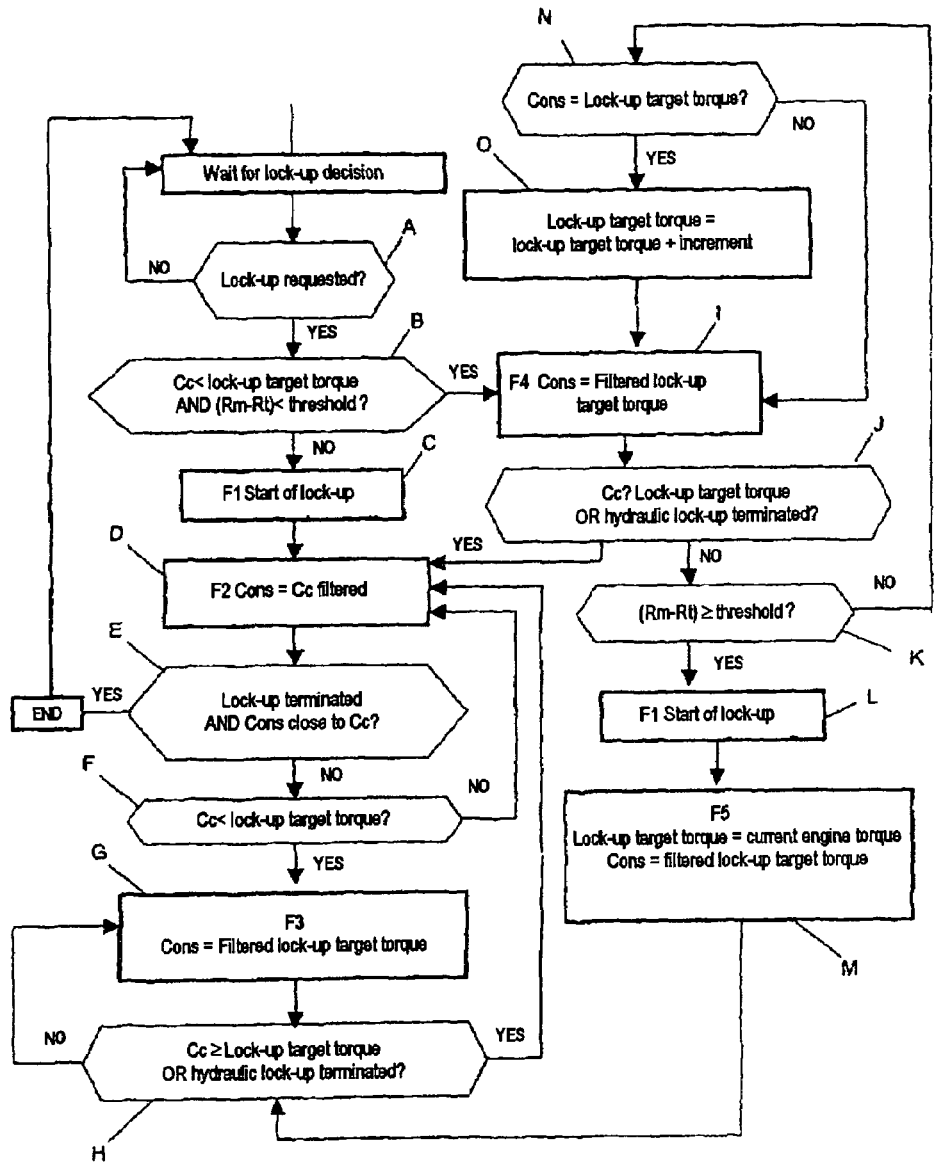
Figure 3:
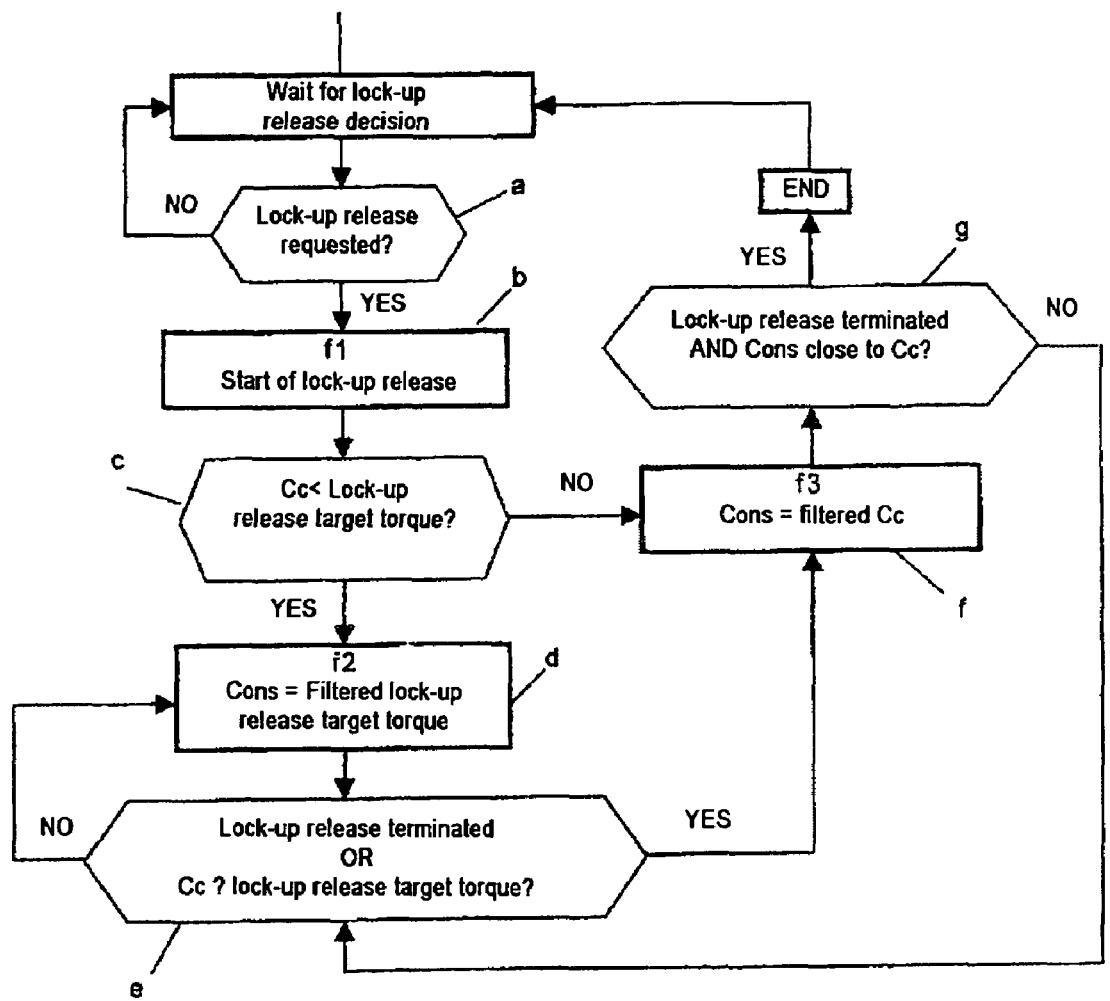

In the appended drawings, given by way of nonlimiting examples:

FIG. 1 is the general diagram of the device for operating an automatic gearbox according to the invention, FIG. 2 is a flow chart showing the various steps of the functioning of the operating device in the case of a lock-up, FIG. 3 is a flow chart showing the various steps of the functioning of the operating device in the case of a release of lock-up.

As represented in FIG. 1, the engine 4 is controlled by a control unit 2 and the gearbox 7 is controlled by a control unit 3. The driver of the vehicle has available a member such as an accelerator pedal 1 on which he acts in order to control the engine 4 so that the latter provides a certain torque with the aim of obtaining an acceleration of the vehicle. The accelerator pedal 1 sends the engine control unit 2 an electrical signal representing the angular position of the pedal. This position is transformed into a torque request by the engine control unit 2. The control unit 2 acts on the engine 4 so that the latter provides the expected torque.

The control unit 3 of the gearbox 7 can transmit a control order for the engine, such as a torque preset, to the engine control unit 2. The torque request sent to the engine by the engine control unit 2 is dependent on the torque requested by the driver of the vehicle and on the torque preset. The torque request sent to the engine by the engine control unit 2 corresponds either to the torque requested by the driver of the vehicle in the absence of any torque preset, or to the torque preset transmitted by the control unit 3 of the gearbox.

The coupling element 5 situated between the engine 4 and the automatic gearbox 7 is a torque converter possessing a latching device 6 (lock-up) making it possible in certain cases of functioning to interlock the engine shaft with the input shaft of the gearbox, so as to effect a lock-up.

The chart of FIG. 2 describes the various steps of the functioning of the operating device in the case of a lock-up. The device makes provision for the control unit 3 of the box 7 to transmit a torque preset to the control unit 2 of the engine throughout the duration of the lock-up as described in FIG. 2.

In step A, the control unit 3 of the gearbox determines whether there is reason to effect a lock-up. In the negative, no particular torque preset is transmitted to the control unit 2 of the engine. If a lock-up is decided, step B is carried out.

In step B, the control unit 3 tests whether the torque representative of the desire of the driver (Cc) provided by the control unit 2 of the engine is less than a minimum torque, called lock-up target torque and whether the speed of rotation of the engine is less than and far from the speed of rotation of the turbine (engine speed (Rm)−turbine speed (Rt)<threshold). The lock-up target torque and the speed threshold are determined by the control unit 3 of the box as a function of various parameters such as the turbine speed, the oil temperature or the ratio engaged. If the test is negative, step C is applied directly, otherwise it is step I which is applied.

In step C, the process F1 is applied: the hydraulic operation of the lock-up is instigated using the conventional lock-up strategies. These operations are continued independently of the torques preset transmitted to the control unit 2 of the engine. Once the hydraulic lock-up has been instigated, step D is applied.

In step D, the process F2 is applied: the control unit 3 of the box sends the control unit 2 of the engine a torque preset (Cons) which reaches the driver torque (Cc) through an appropriate filtering so as for example to slow down the dynamism decrease of the engine torque when the foot is lifted with respect to the accelerator pedal. The process F2 may be interrupted depending on the results of the tests of steps E and F.

In step E, the control unit 3 of the gearbox tests whether the "hydraulic" lock-up currently being executed has terminated and whether the torque preset transmitted to the control unit 2 of the engine by the control unit 3 of the box has reached sufficiently close to the driver torque. If it has, the lock-up is considered to have terminated and the control unit 3 of the gearbox tests whether a new lock-up is requested (return to step A). If the test is negative, step F is applied.

In step F, the control unit 3 of the gearbox tests whether the driver torque is less than the lock-up target torque: if it is not, step D continues to be performed: if it is, step G is applied.

In step G, the process F3 is applied: the control unit 3 of the box sends the control unit 2 of the engine a torque preset which reaches the lock-up target torque through an appropriate filtering so as for example to slow down the dynamism of decrease when the foot is lifted with respect to the accelerator pedal. The process F3 may be interrupted depending on the result of the test of step H.

In step H, the control unit 3 of the gearbox tests whether the driver torque is greater than or equal to the lock-up target torque or whether the "hydraulic" lock-up has terminated. If it has, step D is applied again so that the torque preset reaches the driver torque. If it has not, there is a return to step G to allow the process F3 to continue.

In step I, the process F4 is applied: the control unit 3 of the box sends the control unit 2 of the engine a torque preset which reaches the lock-up target torque progressively through a filtering or a ramp. The process F4 may be interrupted depending on the results of the tests of steps J, K and N.

In step J, the control unit 3 of the gearbox tests whether the driver torque is greater than or equal to the lock-up target torque or whether the "hydraulic" lock-up has terminated. If it has, step D is again applied so that the torque preset reaches the driver torque. If it has not, step K is applied.

In step K, the control unit 3 of the gearbox tests whether the speed of rotation of the engine is greater than or close to the speed of rotation of the turbine (engine speed−turbine speed$\geq$threshold). If it is, step L is applied, otherwise step N is applied.

In step L, the process F1 is applied: the hydraulic operation of the lock-up is instigated using the conventional lock-up strategies. These operations are continued independently of the torque presets transmitted to the control unit 2 of the engine. Once the "hydraulic" lock-up has been instigated, step M is applied.

In step M, the test of step K being positive, the current torque suffices for the engine speed to be greater than or close to the turbine speed: the process F5 applies. According to this process, the lock-up target torque is pegged at the real torque provided by the engine and the torque preset reaches the lock-up target torque progressively through a filtering or a ramp. Afterwards, step H is applied again.

In step N, the control unit 3 of the gearbox tests whether the engine torque applied is equal to or close to the target torque so as to verify that the process F4 has gone to term. If the test is negative, we return to step I to continue the process F4. If the test is positive, step O is applied.

In step O, the target torque is insufficient to bring the engine speed to the level of the turbine speed (the test of step K is negative). The process F6 applies: the initial target torque is increased by an increment determined by the control unit 3 of the box. This increment may depend on several parameters such as the difference between the engine speed and the turbine speed for example. Once the target torque has been increased, we return to step I.

The description hereinabove illustrates an exemplary embodiment of the invention, applied to lock-up. Any other technique for regulating slip between the engine speed and the turbine speed during lock-up may be applied.

Likewise, this principle of control may be applied in respect of releases of lock-up. In this case, the control unit 3 of the gearbox can transmit to the control unit 2 of the engine a control order according to which the torque is filtered consistently with the opening of the lock-up 6 (latching device). It may also transmit a torque preset that is greater than the driver torque so as to manage the recoupling of the engine in such a way that it does not interfere with the release of lock-up.

The chart of FIG. 3 describes the various steps of the functioning of the operating device in the case of a release of lock-up. The device makes provision for the control unit 3 of the box 7 to transmit a torque preset to the control unit 2 of the engine throughout the duration of the lock-up release as described in FIG. 3.

In step a, the control unit 3 determines whether there is reason to effect a release of lock-up. In the negative, no particular torque preset is transmitted to the control unit of the engine. If a lock-up release is decided, step b is carried out.

In step b, the process f1 is applied: the hydraulic operation of the lock-up release is instigated using the conventional lock-up release strategies. These operations are continued independently of the torque presets transmitted to the control unit 2 of the engine. Once the "hydraulic" lock-up release has been instigated, step c is applied.

In step c, the control unit 3 tests whether the torque representative of the desire of the driver (Cc) provided by the control unit 2 of the engine is less than a minimum torque, called lock-up release target torque. The lock-up release target torque is determined by the command unit 3 of the box as a function of the various parameters such as the turbine speed, the oil temperature or the ratio engaged. If the test is negative, step f is applied directly, otherwise it is step d which is applied.

In step d, the process f2 is applied: the control unit 3 of the box sends the control unit 2 of the engine a torque preset which reaches the lock-up release target torque progressively through a filtering or a ramp. The process f2 may be interrupted depending on the results of the test of step e.

In step e, the control unit 3 tests whether the torque representative of the desire of the driver is greater than or equal to the lock-up release target torque or whether the "hydraulic" lock-up release has terminated. If the test is positive, step f is applied directly, otherwise it is step d which is applied and the process f2 continues to be applied.

In step f, the process f3 is applied: the control unit 3 of the box sends the control unit 2 of the engine a torque preset which reaches the driver torque through an appropriate filtering for example to slow down the dynamism of decrease of the engine torque when the foot is lifted with respect to the accelerator pedal. The process f3 may be interrupted depending on the results of the tests of steps g and e.

In step g, the control unit 3 of the gearbox tests whether the "hydraulic" lock-up release has terminated and whether the torque preset transmitted to the control unit 2 of the engine by the control unit 3 of the box has reached sufficiently close to the driver torque. If it has, the lock-up release is considered to have terminated and the control unit 3 of the gearbox tests whether a new lock-up release is requested (return to step a). If the test is negative, step e is applied.

The invention claimed is:

1. A device for operating an automatic gearbox coupled to an engine of a motor vehicle by a torque converter comprising:
    a latching device making it possible to interlock an output shaft of the engine and an input shaft of the automatic gearbox so as to effect a lock-up and conversely to effect a release of lock-up;
    an engine control unit configured to transmit to the engine an order including a torque request; and
    a control unit for the gearbox configured to transmit to the engine control unit an order including a torque preset, the torque request being dependent on torque requested by a driver and on the torque preset,
    wherein upon lock-up or release of lock-up, the control unit of the gearbox is configured to compare the torque requested by the driver with a target torque and to compare the difference between a speed of the engine and a speed of a turbine of the torque converter with a threshold and to transmit to the control unit of the engine a torque preset so that the engine torque progressively reaches the target torque and the speed of the engine progressively reaches the speed of the turbine,
    wherein to execute a lock-up when the speed of the turbine of the converter is greater than the speed of the engine, the control unit of the gearbox is configured to transmit to the engine control unit a torque preset greater than the torque requested by the driver of the vehicle so that the speed of the engine becomes close to the speed of the turbine of the converter.

2. An operating device for operating an automatic gearbox coupled to an engine of a motor vehicle by a torque converter comprising:
    a latching device making it possible to interlock an output shaft of the engine and an input shaft of the automatic gearbox so as to effect a lock-up and conversely to effect a release of lock-up;
    an engine control unit configured to transmit to the engine an order including a torque request; and
    a control unit for the gearbox configured to transmit to the engine control unit an order including a torque preset, the torque request being dependent on an angular position of an acceleration pedal for the motor vehicle thereby providing a torque requested by a driver and on the torque preset,
    wherein upon lock-up or release of lock-up, the control unit of the gearbox is configured to compare the torque requested by the driver with a target torque and to compare the difference between a speed of the engine and a speed of a turbine of the torque converter with a threshold, wherein said speed of the turbine corresponds to a speed of rotation of an output of the torque converter, and to transmit to the control unit of the engine a torque preset so that the engine torque progressively reaches the target torque and the speed of the engine progressively reaches the speed of the turbine, wherein to execute a lock-up during a rapid decrease in the torque of the engine due to a relaxing by the driver of the accelerator pedal, the control unit of the gearbox transmits to the control unit of the engine a torque preset so as to slow down a rate of decrease of the torque.

3. A device for operating an automatic gearbox coupled to an engine of a motor vehicle by a torque converter comprising:

a latching device making it possible to interlock an output shaft of the engine and an input shaft of the automatic gearbox so as to effect a lock-up and conversely to effect a release of lock-up;

an engine control unit configured to transmit to the engine an order including a torque request; and a control unit for the gearbox configured to transmit to the engine control unit an order including a torque preset, the torque request being dependent on torque requested by a driver and on the torque preset, wherein upon lock-up or release of lock-up, the control unit of the gearbox is configured to compare the torque requested by the driver with a target torque and to compare the difference between a speed of the engine and a speed of a turbine of the torque converter with a threshold and to transmit to the control unit of the engine a torque preset so that the engine torque progressively reaches the target torque and the speed of the engine progressively reaches the speed of the turbine, wherein to execute a lock-up release when the engine is in an injection cutoff mode, the control unit of the gearbox is configured to transmit to the control unit of the engine a torque preset greater than the torque requested by the driver of the vehicle so that the lock-up release does not occur while the engine is in the injection cutoff mode.

4. A device for operating an automatic gearbox coupled to an engine of a motor vehicle by a torque converter comprising:

a latching device making it possible to interlock an output shaft of the engine and an input shaft of the automatic gearbox so as to effect a lock-up and conversely to effect a release of lock-up;

an engine control unit configured to transmit to the engine an order including a torque request; and a control unit for the gearbox configured to transmit to the engine control unit an order including a torque preset, the torque request being dependent on torque requested by a driver and on the torque preset, wherein upon lock-up or release of lock-up, the control unit of the gearbox is configured to compare the torque requested by the driver with a target torque and to compare the difference between a speed of the engine and a speed of a turbine of the torque converter with a threshold and to transmit to the control unit of the engine a torque preset so that the engine torque progressively reaches the target torque and the speed of the engine progressively reaches the speed of the turbine, wherein to execute a lock-up release upon a rapid decrease in the torque of the engine due to a relaxing by the driver of an accelerator pedal, the control unit of the gearbox is configured to transmit to the control unit of the engine a torque preset so as to slow down a rate of decrease of the torque.

5. The operating device as claimed in claim 1, wherein the control unit of the gearbox comprises means for adjusting hydraulic pressure applied to the latching device, upon execution of the lock-up and release of lock-up.

6. An operating device for operating an automatic gearbox coupled to an engine of a motor vehicle by a torque converter comprising:

a latching device making it possible to interlock an output shaft of the engine and an input shaft of the automatic gearbox so as to effect a lock-up and conversely to effect a release of lock-up;

an engine control unit configured to transmit to the engine an order including a torque request; and a control unit for the gearbox configured to transmit to the engine control unit an order including a torque preset, the torque request being dependent on an angular position of an acceleration pedal for the motor vehicle thereby providing a torque requested by a driver and on the torque preset, wherein upon lock-up or release of lock-up, the control unit of the gearbox is configured to compare the torque requested by the driver with a target torque and to compare the difference between a speed of the engine and a speed of a turbine of the torque converter with a threshold, wherein said speed of the turbine corresponds to a speed of rotation of an output of the torque converter, and to transmit to the control unit of the engine a torque preset so that the engine torque progressively reaches the target torque and the speed of the engine progressively reaches the speed of the turbine, wherein the control unit of the gearbox is configured to determine the target torque and the speed threshold, as a function of the speed of the turbine, of temperature of oil of the gearbox, and of a gear ratio which is engaged.

7. A method of controlling a lock-up in an automatic gearbox coupled to an engine of a motor vehicle by a torque converter including a latching device to interlock an output shaft of the engine and an input shaft of the automatic gearbox so as to effect the lock-up and conversely to effect the release of lock-up, and furthermore including an engine control unit configured to transmit to the engine an order including a torque request and a control unit of the gearbox configured to transmit to the control unit of the engine an order including a torque preset, the torque request being dependent on an angular position of an acceleration pedal for the motor vehicle thereby providing a torque requested by a driver and on the torque preset, wherein:

comparing, with the control unit of the gearbox, the torque requested by the driver with a target torque, comparing the difference between a speed of the engine and a speed of the turbine of the torque converter with a threshold, wherein said speed of the turbine corresponds to a speed of rotation of an output of the torque converter, and transmitting to the control unit of the engine a torque preset so that the engine torque progressively reaches the target torque and the speed of the engine progressively reaches the speed of the turbine, said method further comprising:

A) determining, with the control unit of the gearbox, whether there is reason to effect a lock-up and if a lock-up is decided;

B) testing, with the control unit, whether a driver torque requested by the driver provided by the control unit of the engine is less than a minimum lock-up target torque, and whether speed of rotation of the engine is less than and far from speed of rotation of the turbine (engine speed (Rm)−turbine speed (Rt)<threshold); and if the test is negative, operation C is applied directly, otherwise operation I is applied, C) instigating hydraulic operation of the lock-up;

D) sending, from the control unit of the gearbox to the control unit of the engine, a torque preset that progressively reaches the driver torque;

E) testing, with the control unit of the gearbox, whether the lock-up currently being executed has terminated and whether the torque preset transmitted to the control unit of the engine by the control unit of the box has reached sufficiently close to the driver torque: if it has, considering the lock-up to have terminated and testing with the control unit of the gearbox whether a new lock-up is requested by returning to operation A; if the test is negative, applying step F;

F) testing, with the control unit of the gearbox, whether the driver torque is less than the lock-up target torque: if it is not, continuing performing step D; if it is, applying step G;

G) sending, from the control unit of the gearbox to the control unit of the engine, a torque preset that progressively reaches the lock-up target torque;

H) testing, with the control unit of the gearbox, whether the driver torque is greater than or equal to the lock-up target torque or whether the lock-up has terminated: if it has, applying step D again so that the torque preset reaches the driver torque; if it has not, returning to step G;

I) sending, from the control unit of the gearbox to the control unit of the engine, a torque preset that progressively reaches the lock-up target torque;

J) testing, with the control unit of the gearbox, whether the driver torque is greater than or equal to the lock-up target torque or whether the lock-up has terminated: if it has, applying step D again so that the torque preset reaches the driver torque; if it has not, applying step K;

K) testing, with the control unit of the gearbox, whether speed of rotation of the engine is greater than or close to speed of rotation of the turbine (engine speed−turbine speed≧threshold), if it is, applying step L, otherwise applying step N;

L) instigating the hydraulic operation of the lock-up;

M) the test of operation K being positive, current torque suffices for the engine speed to be greater than or close to the turbine speed; the lock-up target torque is pegged at a real torque provided by the engine and the torque preset progressively reaches the lock-up target torque;

N) testing, with the control unit of the gearbox, whether the engine torque applied is equal or close to the target torque: if the test is negative, returning to step I; if the test is positive, applying step O;

O) the target torque is insufficient to bring the engine speed to the level of the turbine speed, the test of operation K is negative: the initial target torque is increased by an increment determined by the control unit of the box, dependent on plural parameters including the difference between the engine speed and the turbine speed, then the method returns to operation I.

8. A method of controlling a release of lock-up in an automatic gearbox coupled to an engine of a motor vehicle by a torque converter including a latching device to interlock an output shaft of the engine and an input shaft of the automatic gearbox so as to effect the lock-up and conversely to effect the release of lock-up, and furthermore including an engine control unit configured to transmit to the engine an order including a torque request and a control unit of the gearbox configured to transmit to the control unit of the engine an order including a torque preset, the torque request being dependent on an angular position of an acceleration pedal for the motor vehicle thereby providing a torque requested by a driver and on the torque preset, wherein:

comparing, with the control unit of the gearbox, the torque requested by the driver with a target torque, comparing the difference between a speed of the engine and a speed of the turbine of the torque converter with a threshold, wherein said speed of the turbine corresponds to a speed of rotation of an output of the torque converter, and transmitting to the control unit of the engine a torque preset so that the engine torque progressively reaches the target torque and the speed of the engine progressively reaches the speed of the turbine, said method further comprising:

a) determining, by the control unit, whether there is reason to effect a release of lock-up: if a lock-up release is decided;

b) instigating hydraulic operation of the lock-up release;

c) testing, with the control unit tests, whether a driver torque representative of the desire of the driver provided by the control unit of the engine is less than a minimum lock-up release target torque: if the test is negative, applying step f directly, otherwise applying step d;

d) sending, from the control unit of the box to the control unit of the engine, a torque preset that reaches the lock-up release target torque progressively;

e) testing, with the control unit, whether the driver torque is greater than or equal to the lock-up release target torque or whether the lock-up release has terminated: if the test is positive, applying step operation f is applied directly, otherwise applying step d, f) sending, from the control unit of the box to the control unit of the engine, a torque preset that progressively reaches the driver torque;

g) testing, with the control unit of the gearbox, whether the lock-up release has terminated and whether the torque preset transmitted to the control unit of the engine by the control unit of the box has reached sufficiently close to the driver torque: if it has, considering the lock-up release to have terminated and testing with the control unit of the gearbox whether a new lock-up release is requested (return to operation a); if the test is negative, applying step.

* * * * *